(12) United States Patent
Klein et al.

(10) Patent No.: US 12,505,479 B2
(45) Date of Patent: *Dec. 23, 2025

(54) SYSTEM AND METHOD FOR DETECTING VISUALLY SIMILAR ITEMS

(71) Applicant: eBay Inc., San Jose, CA (US)

(72) Inventors: Benjamin Eliot Klein, Princeton, NJ (US); Adi Guila Haviv, New York, NY (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,018

(22) Filed: Aug. 17, 2023

(65) Prior Publication Data

US 2023/0394550 A1    Dec. 7, 2023

Related U.S. Application Data

(63) Continuation of application No. 15/430,191, filed on Feb. 10, 2017, now Pat. No. 11,769,193.

(60) Provisional application No. 62/294,178, filed on Feb. 11, 2016.

(51) Int. Cl.
*G06Q 30/0601* (2023.01)
*G06V 10/764* (2022.01)

(52) U.S. Cl.
CPC ..... *G06Q 30/06313* (2025.08); *G06V 10/764* (2022.01)

(58) Field of Classification Search
CPC .......... G06Q 30/0631; G06Q 30/06313; G06F 18/2414; G06F 18/24147; G06N 3/045; G06V 10/454; G06V 10/764; G06V 10/82

See application file for complete search history.

(56) References Cited

U.S. PATENT DOCUMENTS

| | | |
|---|---|---|
| 10,055,489 B2 | 8/2018 | Haviv et al. |
| 10,109,051 B1 * | 10/2018 | Natesh ................... G06V 20/10 |
| 11,769,193 B2 | 9/2023 | Klein et al. |

(Continued)

OTHER PUBLICATIONS

Fashion DNA: Merging Content and Sales Data for Recommendation and Article Mapping, Christian Bracher and Sebastian Heinz and Roland Vollgraf, 2016, 1609.02489 (Year: 2016).*

(Continued)

*Primary Examiner* — Jeffrey A. Smith
*Assistant Examiner* — Latasha D Ramphal
(74) *Attorney, Agent, or Firm* — FIG. 1 Patents

(57) ABSTRACT

A computer-implemented method includes determining a set of target listings, retrieving a seed image associated with the seed listing, the seed listing is categorized within a first item category, and generating a seed item feature vector for the seed image using a convolutional neural network (CNN) trained with images of items. The method also includes identifying a plurality of feature vectors associated with the first item category, comparing the seed item feature vector to the plurality of feature vectors using a k-nearest neighbors (kNN) algorithm, and generating a set of nearest neighbor listings to the seed listing. The method further includes storing the set of nearest neighbor listings as associated with the seed listing, selecting one or more nearest neighbor listings from the set of nearest neighbors, and presenting the one or more nearest neighbor listings as a recommendation to a user of the online e-commerce system.

20 Claims, 7 Drawing Sheets

(56) References Cited

U.S. PATENT DOCUMENTS

| | | | |
|---|---|---|---|
| 2009/0132457 A1* | 5/2009 | Brandenburg | G06F 11/3495 706/48 |
| 2015/0067471 A1 | 3/2015 | Bhardwaj et al. | |
| 2015/0370833 A1* | 12/2015 | Fey | G06F 16/532 707/767 |
| 2016/0196672 A1 | 7/2016 | Chertok et al. | |
| 2016/0225053 A1 | 8/2016 | Romley et al. | |
| 2017/0132526 A1 | 5/2017 | Cohen et al. | |
| 2018/0121798 A1 | 5/2018 | Barkan et al. | |
| 2018/0210874 A1* | 7/2018 | Fuxman | G06F 40/30 |
| 2018/0322208 A1 | 11/2018 | Barrios et al. | |

OTHER PUBLICATIONS

U.S. Appl. No. 15/430,191, "Advisory Action Received for U.S. Appl. No. 15/430,191, mailed on Sep. 29, 2020", Sep. 29, 2020, 2 pages.

U.S. Appl. No. 15/430,191, "Final Office Action Received for U.S. Appl. No. 15/430,191, mailed on Apr. 12, 2022", Apr. 12, 2022, 20 pages.

U.S. Appl. No. 15/430,191, "Final Office Action Received for U.S. Appl. No. 15/430,191, mailed on Jan. 13, 2023", Jan. 13, 2023, 20 pages.

U.S. Appl. No. 15/430,191, "Final Office Action received for U.S. Appl. No. 15/430,191, mailed on Jul. 23, 2020", Jul. 23, 2020, 20 pages.

U.S. Appl. No. 15/430,191, "First Action Interview Office Action Summary Received for U.S. Appl. No. 15/430,191, mailed on Jan. 17, 2020", Jan. 17, 2020, 7 pages.

U.S. Appl. No. 15/430,191, "First Action Interview Pro-Interview Communication received for U.S. Appl. No. 15/430,191, mailed on Jul. 29, 2019", Jul. 29, 2019, 7 pages.

U.S. Appl. No. 15/430,191, "Non Final Office Action Received for U.S. Appl. No. 15/430,191, mailed on Aug. 4, 2021", Aug. 4, 2021, 18 pages.

U.S. Appl. No. 15/430,191, "Non Final Office Action Received for U.S. Appl. No. 15/430,191, mailed on Jun. 22, 2022", Jun. 22, 2022, 19 pages.

U.S. Appl. No. 15/430,191, "Notice of Allowance", U.S. Appl. No. 15/430,191, May 31, 2023, 19 pages.

Bansal, et al., "Tailoring Continuous Word Representations for Dependency Parsing", Proceedings of the 52nd Annual Meeting of the Association for Computational Linguistics (Short Papers), Baltimore, Maryland, USA, 2014, pp. 809-815.

Bell, Sean, et al., "Learning visual similarity for product design with convolutional neural networks", ACM Transactions on Graphics (TOG)—Proceedings of ACM SIGGRAPH, Aug. 2015, 10 pages.

Bordes, Antoine, et al., "Translating Embeddings for Modeling Multi-relational Data", Advances in Neural Information Processing Systems 26 [retrieved Aug. 17, 2022]. Retrieved from the Internet <https://proceedings.neurips.cc/paper/2013/file/1cecc7a77928ca8133fa24680a88d2f9-Paper.pdf>., Dec. 2013, 9 pages.

Zakrewsky, "Predicting E-commerce item popularity using image quality features", Ph.D. diss., Drexel University, https://dialog.proquest.com/professional/docview/1820918727?accountid=131444, 2016, 40 pages.

* cited by examiner

SYSTEM AND METHOD FOR DETECTING VISUALLY SIMILAR ITEMS

RELATED APPLICATIONS

This application is a continuation of and claims priority to U.S. patent application Ser. No. 15/430,191, filed Feb. 10, 2017, entitled "SYSTEM AND METHOD FOR DETECTING VISUALLY SIMILAR ITEMS", which claims the benefit of priority to U.S. Provisional Patent Application Ser. No. 62/294,178, filed Feb. 11, 2016, herein incorporated by reference in its entirety.

TECHNICAL FIELD

Embodiments of the present disclosure relate generally to image processing and, more particularly, but not by way of limitation, to systems and methods for detecting similar items based on image-based analysis.

BACKGROUND

Some online e-commerce systems (e.g., managing e-commerce sites) allow sellers to offer items for sale. To improve consumer experiences, some online e-commerce systems provide product recommendations to buyers. One known method of generating recommendations for buyers is through "collaborative filtering," which includes generating product recommendations based on some known interest of a target user (e.g., a product recently purchased by the target user) as compared to known data from other users (e.g., product purchase data from other users that purchased the same product). However, in some situations, there may not be enough data about the product, the target user, or other users for known collaborative filtering methods to perform sufficiently. Further, collaborative filtering performs poorly with cross-category recommendations.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used. Like numbers in the Figures indicate like components.

DETAILED DESCRIPTION

Figure 1:
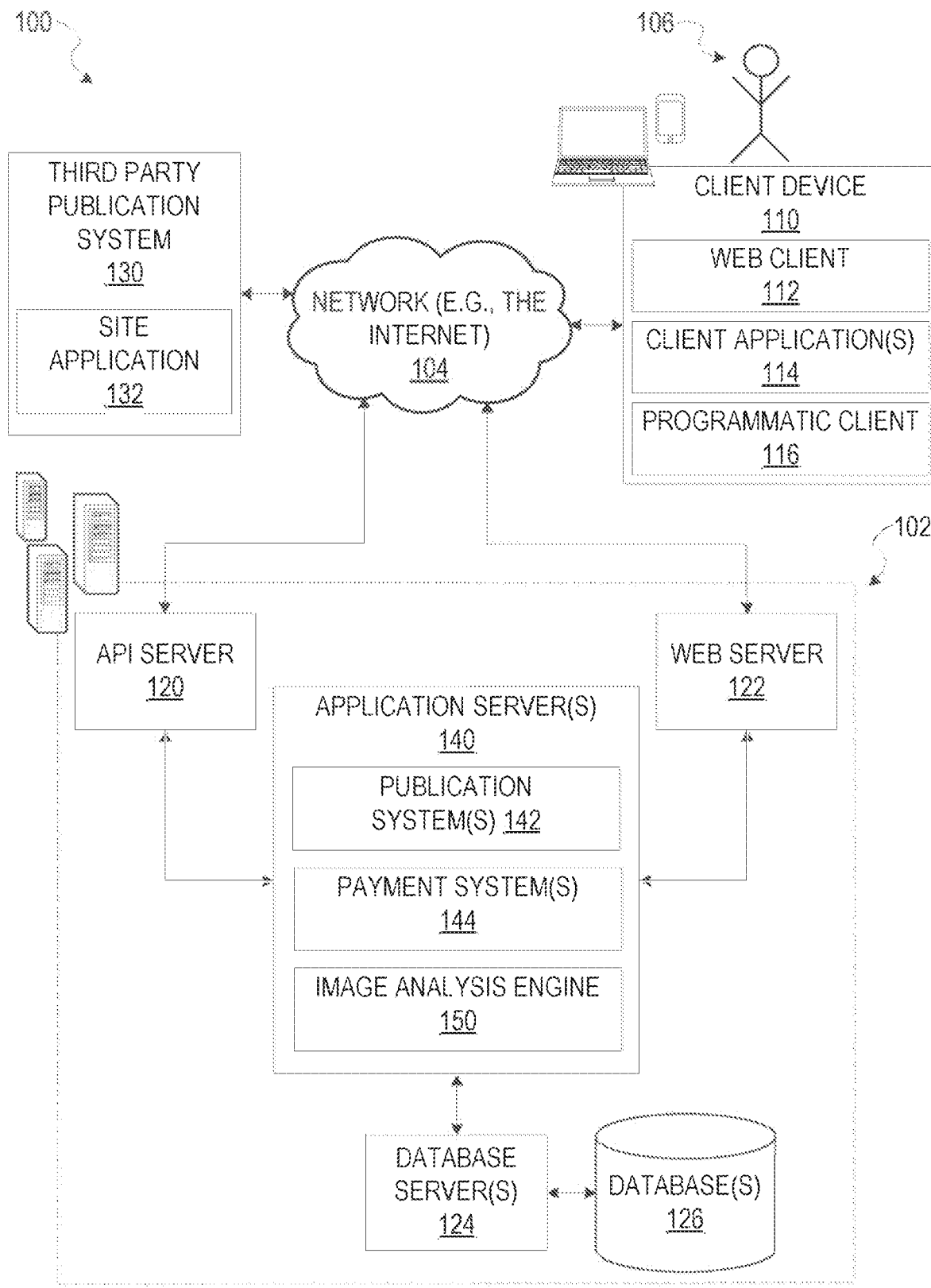
FIG. 1 is a network diagram depicting an example online e-commerce system.

The description that follows includes systems, methods, techniques, instruction sequences, and computing machine program products that describe illustrative embodiments of the disclosure. Numerous specific details are set forth herein in order to provide an understanding of various embodiments of the present subject matter. It will be evident, however, to those skilled in the art, that embodiments of the present subject matter may be practiced without these specific details. In general, well-known instruction instances, protocols, structures, and techniques are not necessarily shown in detail.

An image analysis engine is described herein for providing image-based analysis of items offered for sale in an online e-commerce system. In some scenarios, the online e-commerce system has sparse or non-existent purchase data for some items, thus limiting the possibility of using known behavioral signal approaches for determining similar items. For example, a newly released movie or an uncommon (e.g., low-selling) book may have generated little or no prior purchases through the online e-commerce system and, as a result, there may not be enough purchase history for the item sufficient to generate a satisfactory item recommendation using other methods reliant on such data. In some scenarios, some items may not have adequate data provided to leverage conventional methods for generating item recommendations (e.g., no manufacturer ID provided, or an inadequate or undescriptive title or description). For example, a pair of shoes may be offered for sale by a seller, but the seller may not provide a manufacturer ID that would otherwise indicate data about the shoes, such as manufacturer, type of shoe, shoe features, and so forth. In some scenarios, some items may not have enough behavioral data associated with the item to leverage conventional methods (e.g., a low volume of prior user activity, such as clicks, views, or purchases). To avoid problems with scarce purchase data or absent manufacturer ID, the image analysis engine and methods described herein provide image-based analysis of items offered on the online e-commerce system to generate recommendations for visually similar items (e.g., based on images of the item provided by the sellers).

Finding item similarity based on image analysis presents its own set of challenges. The images provided for various items may depict the items in different poses, or in interaction with other objects, or in challenging backgrounds, or with differing illumination, viewpoint, occlusion, and so forth. In addition, some items are truly unique, making it impossible to find other items which are identical.

In some example embodiments, the items offered for sale by the online e-commerce system, and analyzed by the image analysis engine, include one or more item images (e.g., a digital photo of the image, perhaps uploaded to the online e-commerce site by the seller of the item). The image may be, for example, a stock image of a "model" item generated and promoted by the manufacturer, or may be an image, taken by the seller, of the actual item offered for sale. The image analysis engine performs image-based analysis of the item using the associated image(s). More specifically, in one example embodiment, the image analysis engine performs feature extraction on the image of the "seed item" to generate a feature vector for the image using a pre-trained Convolutional Neural Network (CNN). That feature vector for the seed item is then compared to feature vectors of other items sharing a category with the seed item on the online e-commerce system using a k-nearest neighbors (KNN) process. The k nearest neighbors to the seed item are, thus, identified as similar items to the seed item. The online e-commerce system then stores references to those nearest neighbors within a record of the seed item, thereby identifying the nearest neighbors for later use in generating a similar items recommendation to users identified with the seed item.

In some embodiments, the CNN may utilize a third-party model such as the GoogLeNet model, as promulgated by Google® Inc. In other embodiments, the image analysis engine may train a custom CNN model based on a labeled training set of images. The training set of images may be labeled with a category, or with other fine grained data specific to that category or a particular type of goods. For example, images of athletic shoes may be labeled with manufacturer (e.g., Nike®, Adidas®), or with a type of athletic show (e.g., cross-fit, running, aerobic, basketball), or with particular features of athletic shoes (e.g., shockers, reflectors, Velcro laces). Such a custom model may then be used on that particular category of items.

FIG. 1 is a network diagram depicting an example online e-commerce system 100. In the example embodiment, the online e-commerce system 100 includes a networked system 102 that provides online services to online users, such as a user 106 via a client device 110. The networked system 102 includes an image analysis engine 150 for performing image-based analysis of online items offered for sale via the online e-commerce system 100, and other associated operations, as described herein.

The networked system 102 provides network-based, server-side functionality, via a network 104 (e.g., the Internet or a Wide Area Network (WAN)), to the client devices 110 that may be used, for example, by sellers or buyers (not separately shown) of products and services offered for sale through a publication system 142 (e.g., through an online marketplace system provided by the publication systems 142 or payment systems 144). FIG. 1 further illustrates, for example, one or more of a web client 112 (e.g., a web browser), client application(s) 114, and a programmatic client 116 executing on the client device 110.

Each of the client devices 110 comprises a computing device that includes at least a display and communication capabilities with the network 104 to access the networked system 102. The client device 110 includes devices such as, but not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. Each of the client devices 110 connects with the network 104 via a wired or wireless connection. For example, one or more portions of the network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 includes one or more client applications (also referred to as "apps") 114 such as, but not limited to, a web browser, a messaging application, an electronic mail (email) application, an e-commerce site application (also referred to as a marketplace application), and the like. In some embodiments, if the e-commerce site application is included in a given one of the client devices 110, then this application is configured to locally provide the user interface and at least some of the functionalities of an e-commerce site, with the application configured to communicate with the networked system 102, on an as-needed basis, for data or processing capabilities not locally available (e.g., such as access to a database of items available for sale, to authenticate a user, or to verify a method of payment). Conversely, if the e-commerce site application is not included in a given one of the client devices 110, the given one of the client devices 110 may use its web client 112 to access the e-commerce site (or a variant thereof) hosted on the networked system 102. Although only one client device 110 is shown in FIG. 1, two or more client devices 110 may be included in the online e-commerce system 100.

An Application Program Interface (API) server 120 and a web server 122 are coupled to, and provide programmatic and web interfaces respectively to, one or more application servers 140. In the example embodiment, the application servers 140 host the image analysis engine 150 that facilitates providing analysis and recommendation services, as described herein. The application servers 140 are, in turn, shown to be coupled to one or more database servers 124 that facilitate access to one or more databases 126.

In some embodiments, the application servers 140 host one or more publication systems 142 and payment systems 144. The publication system 142 may provide a number of e-commerce functions and services to users that access the networked system 102 or external sites (e.g., a third party publication system 130 executing a site application 132). E-commerce functions and services may include a number of publisher functions and services (e.g., search, listing, content viewing, payment, etc.). For example, the publication system 142 may provide a number of services and functions to users for listing or submitting offers for goods or services for sale, searching for goods and services, facilitating transactions, and reviewing and providing feedback about transactions and associated users. Additionally, the publication system 142 may track and store data and metadata relating to listings, transactions, and user interactions. In some embodiments, the publication system 142 may publish or otherwise provide access to content items stored in the application servers 140 or the databases 126 accessible to the application servers 140 or the database servers 124. The payment system 144 may likewise provide a number of payment services and functions to users. The payment system 144 may allow users to accumulate value (e.g., in a commercial currency, such as the U.S. dollar, or a proprietary currency, such as "points") in accounts, and then later to redeem the accumulated value for items (e.g., goods or services) that are made available via the publication system 142. While the publication system 142 and the payment system 144 are shown in FIG. 1 to both form part of the networked system 102, it will be appreciated that, in alternative embodiments, the payment system 144 may form part of a payment service that is separate and distinct from the networked system 102. In other embodiments, the payment system 144 may be omitted from the online e-commerce system 100. In some embodiments, at least a portion of the publication system 142 may be provided on the client devices 110.

Further, while the online e-commerce system 100 shown in FIG. 1 employs a client-server architecture, some example embodiments of the present disclosure are not limited to such an architecture, and may equally well find application in, for example, a distributed or peer-to-peer architecture system. The various publication and payment systems 142 and 144 may also be implemented as stand-alone software programs, which do not necessarily have networking capabilities.

The client devices 110 access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the TurboLister application developed by eBay Inc., of San Jose, California) to enable sellers to author and manage listings on the networked system 102 in an offline manner, and to perform batch-mode communications between the programmatic client 116 and the networked system 102.

In the example embodiment, the image analysis engine 150 analyzes images of items associated with listings on the networked system 102. The online e-commerce system 100 may provide item or listing recommendations to users based on user interest, such as determined through online viewing, watching, or purchasing of items through the online e-commerce system 100, as well as item similarity as determined by the systems and methods described herein.

Figure 2:
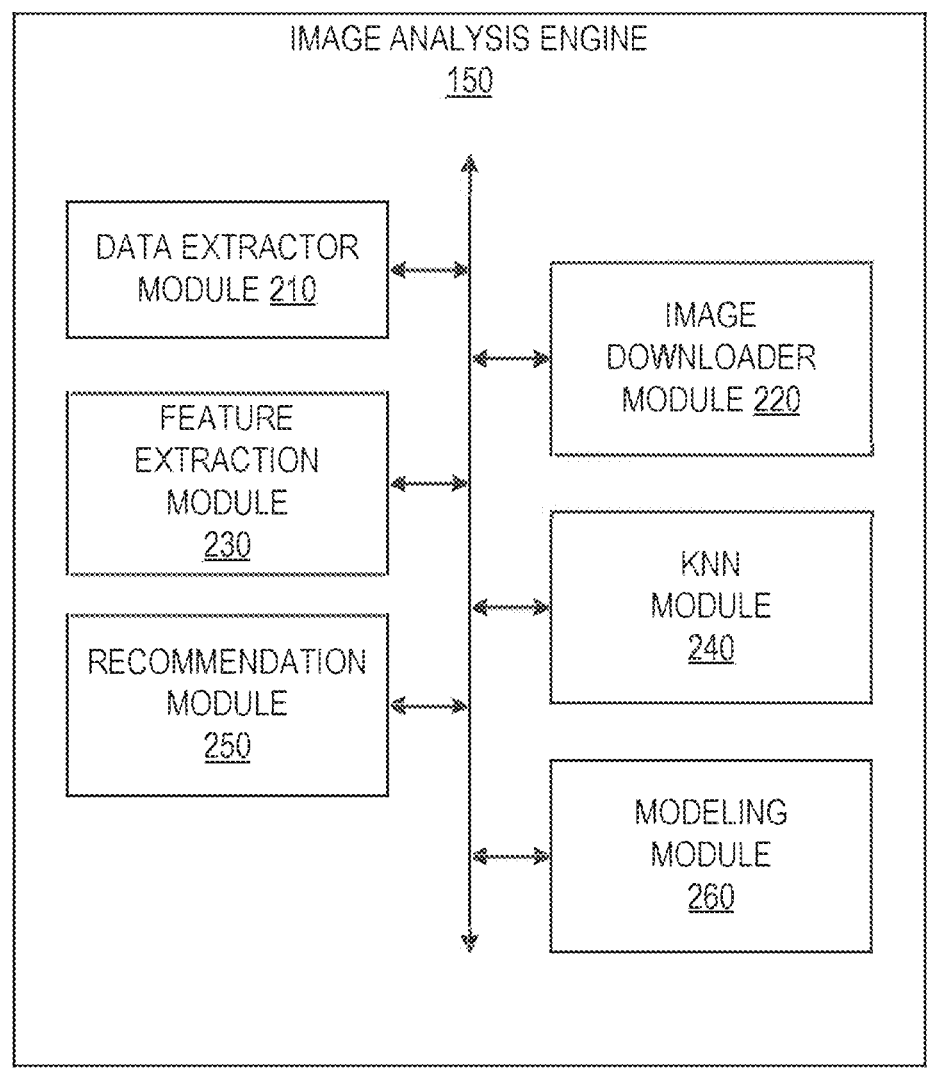
FIG. 2 is a block diagram showing components provided within the image analysis engine, according to some embodiments.

FIG. 2 is a block diagram showing components provided within the image analysis engine 150 according to some embodiments. The image analysis engine 150 may be hosted on dedicated or shared server machines (not shown) that are communicatively coupled to enable communications between the server machines. In some embodiments, components of the image analysis engine 150 may be executed on a graphics processing unit (GPU) such as, for example, one or more Titan X GPUs (such as those made commercially available by NVIDIA corporation, a California corporation, and other manufacturers). The components themselves are communicatively coupled (e.g., via appropriate interfaces) to each other and to various data sources, so as to allow information to be passed between the components or so as to allow the components to share and access common data. Furthermore, the components may access the one or more databases 126 via the database servers 124 (both shown in FIG. 1).

The image analysis engine 150 provides a number of image analysis features related to items or listings, whereby the image analysis engine 150 performs image-based analysis of images associated with items to provide similar item recommendations to users. To this end, the image analysis engine 150 includes a data extractor module 210, an image downloader module 220, a feature extraction module 230, a KNN module 240, a recommendation module 250, and a modeling module 260.

In the example embodiment, the data extractor module 210 determines a set of items (e.g., listings) to prepare for image processing. For example, the image analysis engine 150 may identify a set of listings recently added to the online e-commerce system 100 (e.g., within the last 24 hours), or other listings that have not undergone image analysis as described herein. Each of these listings may include an item ID, a seed image of the associated item offered for sale through the listing (e.g., referenced via an image uniform resource locator (URL)), and may additionally identify one or more categories associated with the listing. The image downloader module 220 retrieves the seed images for each of the identified listings (e.g., using the image URL) and prepares the seed images for further processing. In some embodiments, the seed images are converted to a standard size, such as 224 by 224 pixels.

The feature extraction module 230 performs feature extraction on each of the seed images. In an example embodiment, the feature extraction engine 230 uses the Caffe library for feature extraction based on the GoogLeNet model to generate a feature vector for the image, and thus for the listing itself. As such, each seed image generates an associated feature vector. All of these feature vectors are then added to feature vectors of previously-processed listings to form a cumulative set of feature vectors. Subsequently, for each seed item being processed, the KNN module 240 determines the k nearest neighbors of the seed item based on the feature vector of the seed item and the other feature vectors of items within the same category as the seed item. In some embodiments, the other feature vectors may be for items in other categories. In one example embodiment, the KNN module 240 identifies the 30 nearest neighbors of each seed item, each of which is then treated as a similar item to the seed item. These nearest neighbors each include an associated listing ID. For each seed item, the recommendation module 250 stores the listing IDs of the nearest neighbors of that seed item (e.g., in a database) and, in some embodiments, may cache the nearest neighbors of that seed item in an in-memory database to facilitate prompt access. During operation, when an online shopper engages with the seed item (e.g., viewing the listing, bidding on the listing, purchasing the listing), the recommendation module 250 accesses the nearest neighbors of the seed item and provides similar item recommendations based on the set of nearest neighbors.

In some embodiments, the modeling module 260 may generate the model used by the feature extraction module 230 for feature extraction. The modeling module 260 may identify a labeled training set of images within a particular category, and may create a convolutional neural network using the labeled training set. This custom model may then be used on seed items within that particular category to provide a more refined feature vector.

Figure 3:
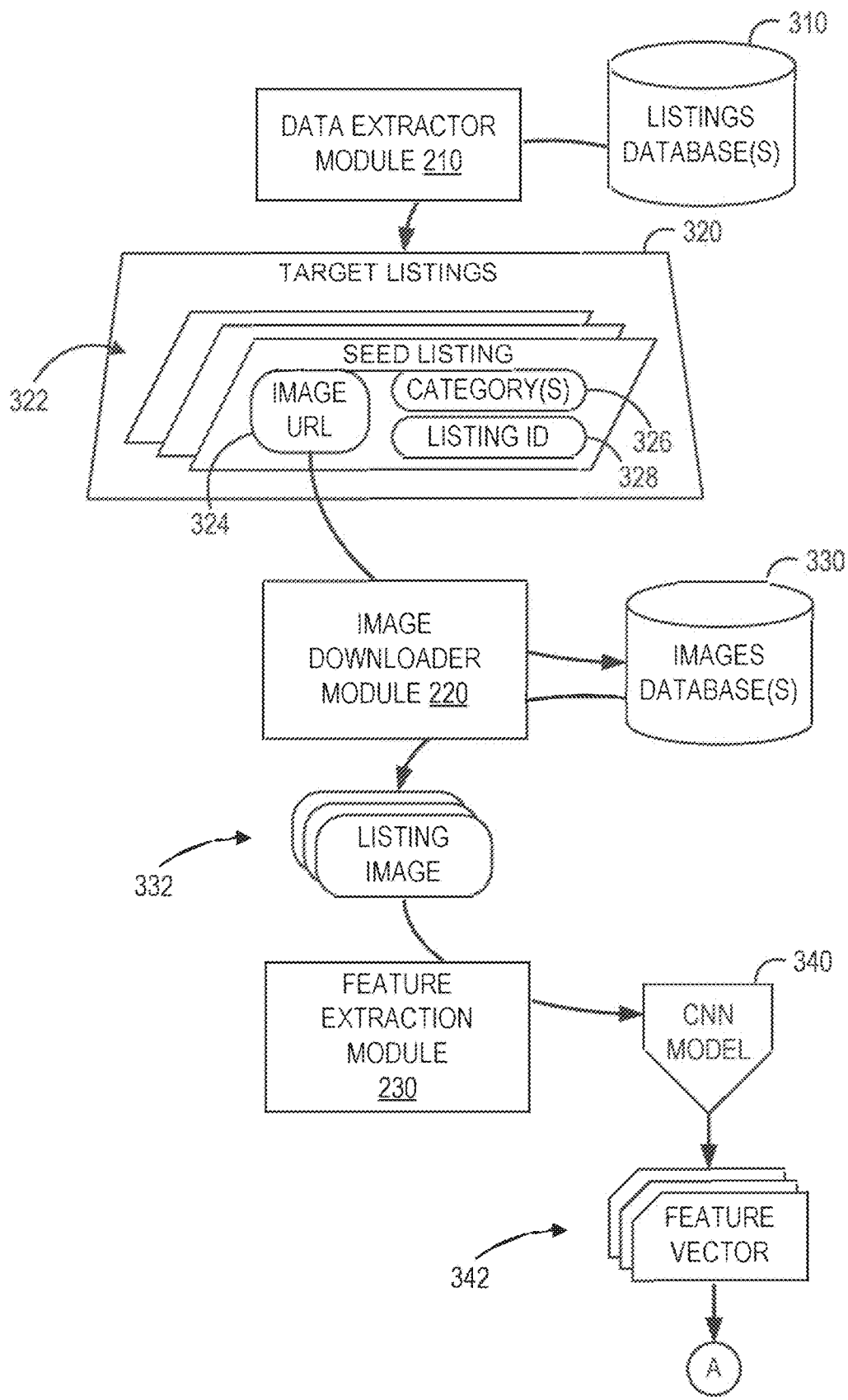
FIG. 3 is a dataflow diagram illustrating an example process for image analysis as performed by the image analysis engine.

FIG. 3 is a dataflow diagram illustrating an example process for image analysis as performed by the image analysis engine 150. In the example embodiment, the data extractor module 210 identifies a set of target listings 320 from a listings database 310. The set of target listings 320 includes seed listings 322 that have not yet been image-analyzed by the image analysis engine 150. In some embodiments, the seed listings 322 include listings that have been added to the online e-commerce system 100 within a pre-determined amount of time (e.g., within the last day, or within the last week). In some embodiments, the set of target listings 320 may include seed listings 322 that have been previously processed, but which may be selected for re-processing (e.g., after a pre-determined amount of time, or after a pre-determined number of subsequent listings have been processed, to "refresh" image comparison results). Each seed listing 322 includes at least one image or a reference to an image (e.g., an image URL 324), one or more listing categories 326, and a listing identifier (ID) unique to that seed listing 322 within the online e-commerce system 100.

In the example embodiment, for each of the seed listings 322 in the set of target listings 320, the image downloader module 220 retrieves an associated image (or "listing image") 332 from an image database 330 using the image URL 324. In some embodiments, the listing images 332 may be stored in the listings database 310. The listing images 332 may undergo pre-processing prior to further use. For example, the image analysis engine 150 may convert the listing images to a standard size, such as 224 by 224 pixels, or may alter aspects of the image to facilitate normalization of varying images.

The feature extraction module 230, in the example embodiment, then utilizes a CNN model 340 to extract features of each image (e.g., one image at a time). The CNN model 340 converts a particular listing image 332 into a feature vector 342 (e.g., an array of n floating-point numbers representing n features of the image 332). In one embodiment, the CNN model 340 is the GoogLeNet model, a third-party model which was trained on the ImageNet dataset with the objective of classifying each image into the correct class out of one thousand objects. Further, the feature extraction module 230 uses the Caffe library to perform the feature extraction with the CNN model 340. As such, each listing image is reduced to an associated feature vector 342.

Figure 4:
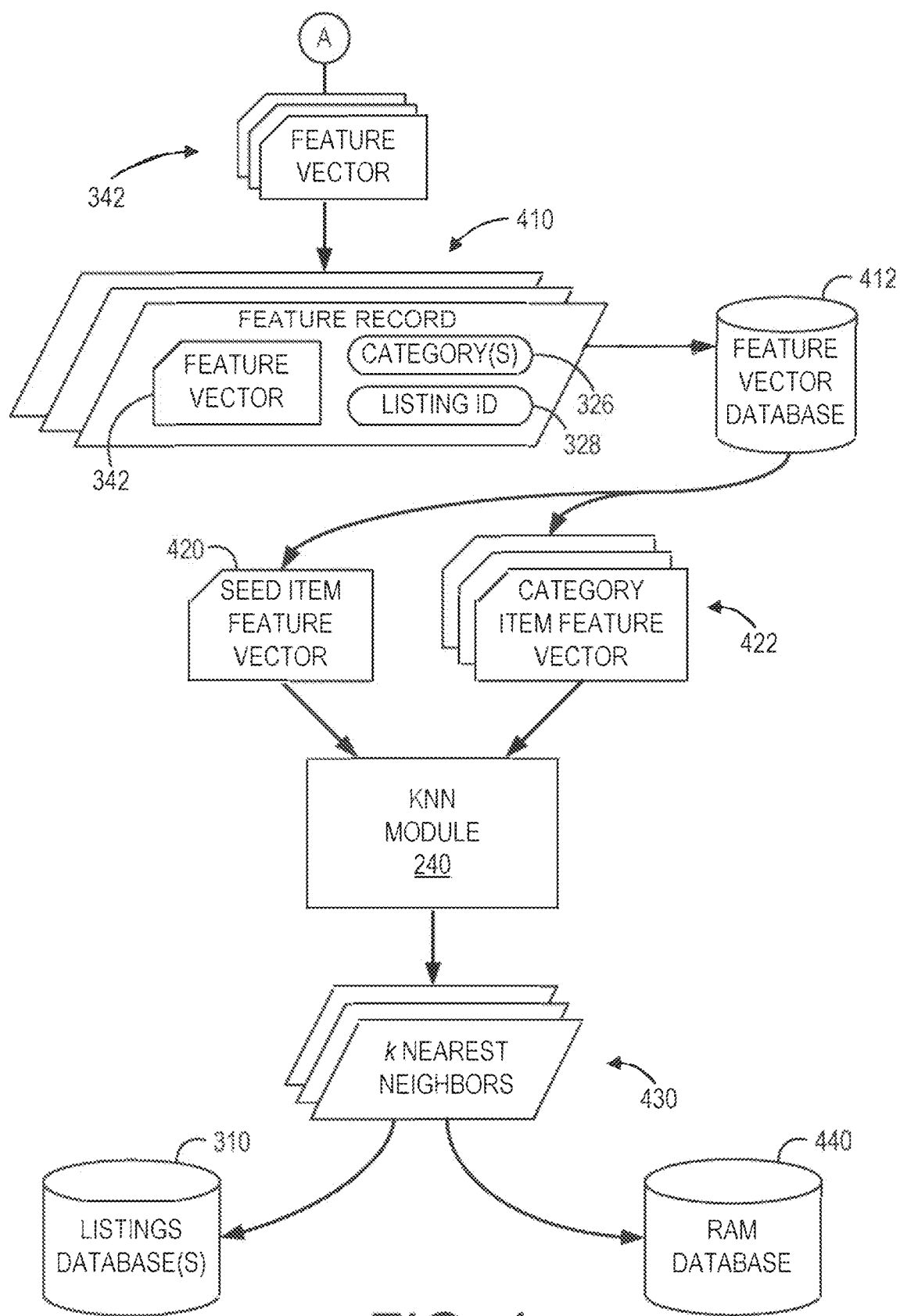
FIG. 4 continues the dataflow diagram shown in FIG. 3.

FIG. 4 continues the dataflow diagram shown in FIG. 3. In the example embodiment, a feature record 410 is created for each seed listing 322. Each feature record 410 includes the listing ID 328 and the category(s) 326 of the seed listing 322, as well as the feature vector 342 just generated for that seed listing 322. The feature records 410 are stored in a vector database 412 for future use. The vector database 412 includes feature records 410 for the recently-processed seed items 322, as well as feature records for previously-processed listings. In other words, the vector database 412 is a cumulative repository for feature vectors of many or all listings of the online e-commerce system 100.

In the example embodiment, the KNN module 240 operates on each seed item 322 to determine a set of k nearest neighbors 430 for that seed item 322. More specifically, for each seed item 322, the KNN module 240 retrieves a seed item feature vector 420 for that seed item 322 as well as a set of feature vectors 422 for all feature records in the feature vector database 412 that share at least one category 326 with the seed item 322 (also referred to herein as category item feature vectors 422). The KNN module 240 then compares the seed item feature vector 420 to the set of category item feature vectors 422 to determine the k nearest neighbors 430. In one embodiment, the KNN module 240 utilizes brute force nearest neighbors on a graphics processing unit (GPU). Restricting the nearest neighbor search to only listings within a shared category strategically limits the amount of processing to only types of items that are most likely to actually be similar to the seed item. For example, in some situations, comparing images cars to an image of a shoe may occasionally generate enough similarity to cause a car to be identified as a nearest neighbor to the shoe (e.g., because of their general shape, color, background). As such, limiting the feature vectors 422 to only those feature vectors 422 in the "shoes" category may keep some errant listings from creeping in.

In the example embodiment, the k nearest neighbors 430 are then utilized by the online e-commerce system 100 to generate "similar item" type recommendations. More specifically, for each seed item 322, its k nearest neighbors 430, as identified by their associated listing IDs 328, are stored in the listing of the seed item 322 in the listings database 310. For performance improvement, the k nearest neighbors 430 for the seed items 322 may be stored in a RAM memory-based database 440, such as Redis. As such, each listing processed by the image analysis engine 150 includes a set of k nearest neighbors that may be used as "similar items" to that seed item. For example, when a buyer of the online e-commerce system 100 accesses the seed item (e.g., via viewing the associated listing, bidding on that listing, buying the seed item via that listing), the online e-commerce system 100 may infer interest in the seed item and, as such, may utilize the k nearest neighbors 430 of that listing to recommend similar listings.

In some embodiments, the image analysis engine 150 may generate a custom model to use as the CNN model 340. For example, the image analysis engine 150 may identify a set of labeled training listings (not separately depicted) for use in training the CNN model 340. The training listings may be labeled based on manufacturer, or features or characteristics of the item, or a listing category of the listing, or another signal that corresponds to a similarity measure between the items. The modeling module 260 may then train the CNN model 340 using the labeled training set. In some embodiments, the modeling module 260 may train the CNN model 340 using a convolutional neural network leveraging aspects of deep learning. As such, the custom CNN model 340 may then be better able to determine features associated with the labels. For example, a custom CNN model 340 trained with training listings of shoes labeled with a manufacturer name may better be able to distinguish between Nike® shoes and Reebok® shoes. The resulting customized model 340 may then be deployed to specific seed listings 322. For example, when encountering a seed listing 322 for which a custom CNN model 340 has been developed (e.g., when the seed listing 322 is categorized in "shoes"), the feature extraction engine 230 may use the custom CNN model 340 associated with shoes rather than the generic CNN model 340 trained across disparate types of items.

Figure 5:
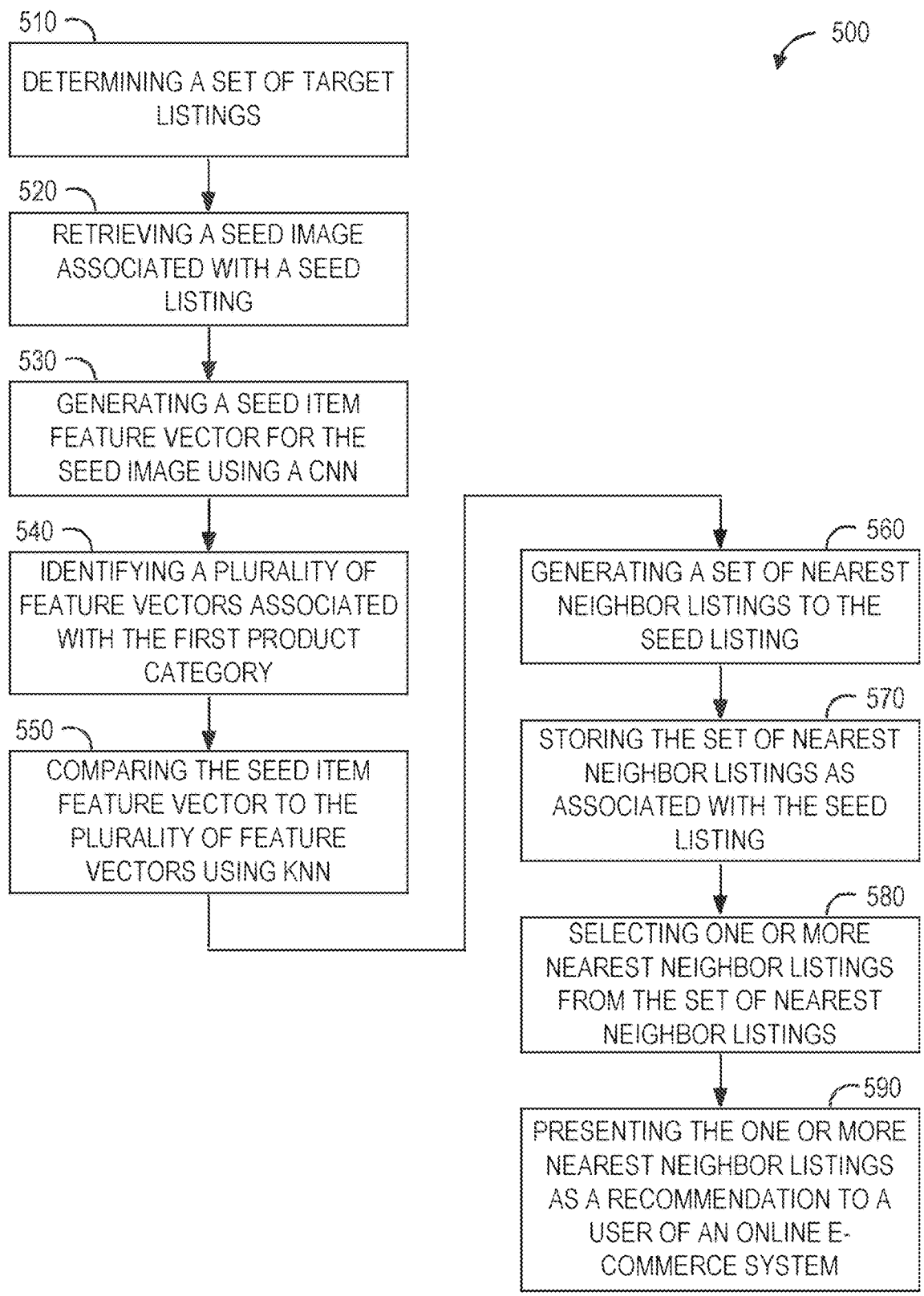
FIG. 5 illustrates a computerized method, in accordance with an example embodiment, for image-based analysis of listings.

FIG. 5 illustrates a computerized method 500, in accordance with an example embodiment, for image-based analysis of listings. The computerized method 500 is performed by a computing device comprising at least one processor and a memory. In the example embodiment, at operation 510, the computerized method 500 includes determining a set of target listings, each target listing of the set of target listings includes a category identifier, a listing identifier, and an image associated with the item. In some embodiments, determining a set of target listings further includes determining target listings added to the online e-commerce system within a pre-determined period of time.

At operation 520, the computerized method 500 includes, for a seed listing of the set of target listings, retrieving a seed image associated with the seed listing, the seed listing is categorized within a first item category. At operation 530, the computerized method 500 includes generating a seed item feature vector for the seed image using a convolutional neural network (CNN) trained with images of items, the seed image is an input to the CNN, the seed item feature vector includes an array of values representing features of the image. In some embodiments, the CNN uses the GoogLeNet model.

In the example embodiment, at operation 540, the computerized method 500 also includes identifying a plurality of feature vectors associated with the first item category, each feature vector of the plurality of feature vectors is associated with a listing categorized within the first item category. At operation 550, the computerized method 500 further includes comparing the seed item feature vector to the plurality of feature vectors using a k-nearest neighbors (kNN) algorithm. At operation 560, the computerized method 500 also includes, based on the comparing, generating a set of nearest neighbor listings to the seed listing, each nearest neighbor listing represents a listing for a item that is visually similar to the seed item and that is categorized within the first item category. At operation 570, the computerized method 500 further includes storing the set of nearest neighbor listings as associated with the seed listing. At operation 580, the computerized method 500 also includes selecting one or more nearest neighbor listings from the set of nearest neighbors. At operation 590, the computerized method 500 further includes presenting the one or more nearest neighbor listings as a recommendation to a user of an online e-commerce system.

In some embodiments, the computerized method 500 also includes generating a database entry including the listing identifier of the seed item and listing identifiers of each listing in the set of nearest neighbor listings, and storing the database entry in an in-memory database, wherein selecting one or more nearest neighbor listings further includes selecting the one or more nearest neighbor listings from the database entry. In some embodiments, the computerized method further includes converting the seed image to a standard size prior to generating the seed item feature vector, the standard size is used for images used to generate the plurality of feature vectors. In some embodiments, the computerized method 500 also includes storing the seed item feature vector along with the plurality of feature vectors for use in future similarity comparisons. In some embodiments, the computerized method 500 further includes identifying a labeled set of images associated with the first item category, each image in the labeled set of images includes a label based on a first category factor, the first category factor identifies a factor applicable to items within the first item category, and training the CNN based on the labeled set of images.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines.

In some example embodiments, the processors or processor-implemented modules may be located in a single geographic location (e.g., within a home environment, an office environment, or a server farm). In other example embodiments, the processors or processor-implemented modules may be distributed across a number of geographic locations.

Software Architecture

Figure 6:
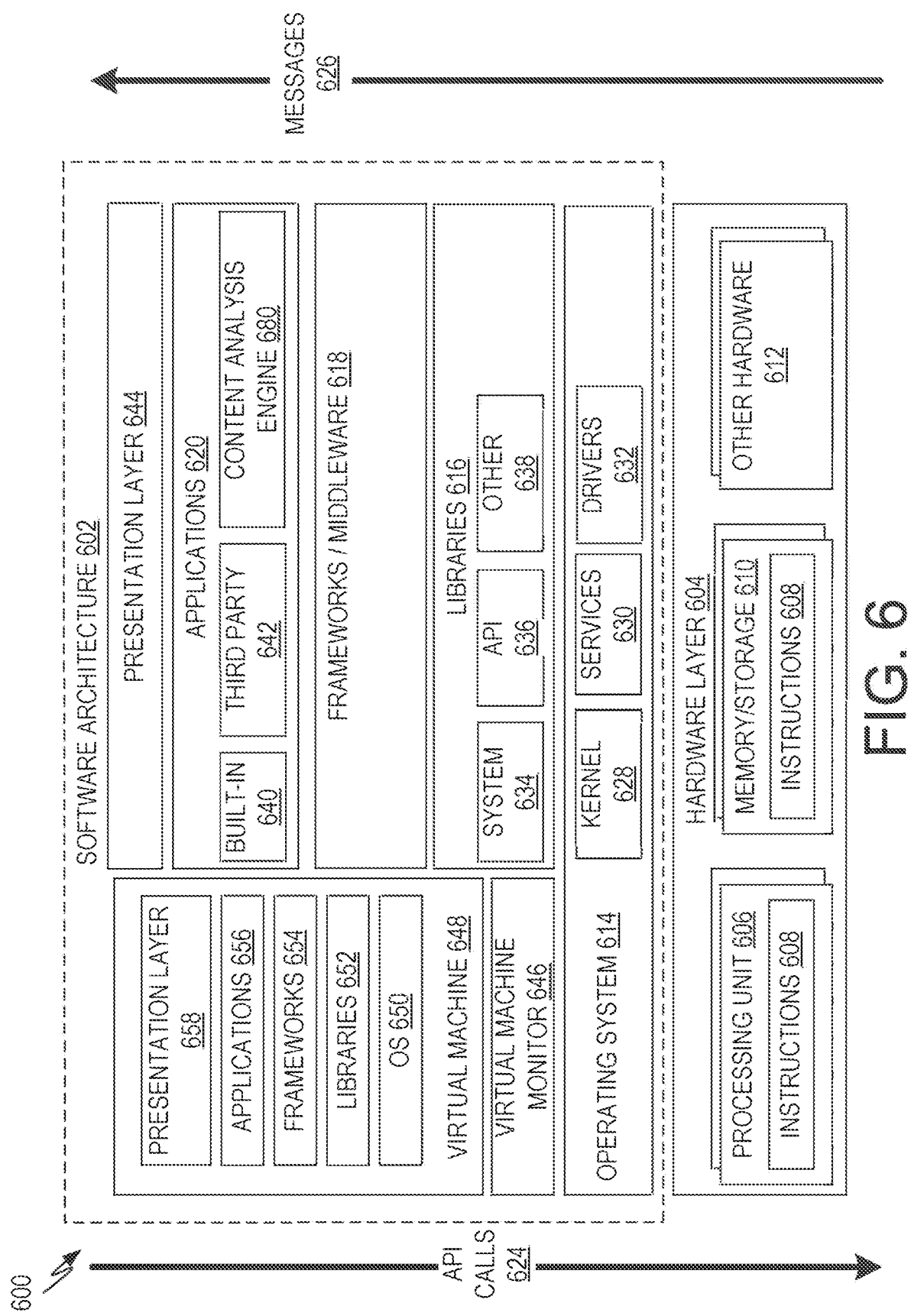
FIG. 6 is a block diagram illustrating an example software architecture, which may be used, in conjunction with various hardware architectures herein described, to perform image-based analysis of listings (e.g., on the online e-commerce system shown in FIG. 1).

FIG. 6 is a block diagram 600 illustrating an example software architecture 602, which may be used, in conjunction with various hardware architectures herein described, to perform image-based analysis of listings (e.g., on the online e-commerce system 100). A image analysis engine 680, which is shown in a laywer of applications 620, may be similar to the image analysis engine 150, but may be provided in whole or in part at other layers shown in FIG. 6. FIG. 6 is a non-limiting example of a software architecture 602, and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 having associated executable instructions 608. The executable instructions 608 represent the executable instructions of the software architecture 602, including implementation of the methods, modules, and so forth described herein. The hardware layer 604 also includes memory/storage 610, which also includes the executable instructions 608. The hardware layer 604 may also comprise other hardware 612.

In the example architecture of FIG. 6, the software architecture 602 may be conceptualized as a stack of layers where each layer provides particular functionality. For example, the software architecture 602 may include layers such as an operating system 614, libraries 616, frameworks or middleware 618, applications 620, and a presentation layer 644. Operationally, the applications 620 and/or other components within the layers may invoke application programming interface (API) calls 624 through the software stack and receive a response as messages 626. The layers illustrated are representative in nature and not all software architectures 602 have all layers. For example, some mobile or special purpose operating systems 614 may not provide the frameworks/middleware 618, while others may provide such a layer. Other software architectures 602 may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be used by the applications 620 and/or other components and/or layers. The libraries 616 typically provide functionality that allows other software modules to perform tasks in an easier fashion than by interfacing directly with the underlying operating system 614 functionality (e.g., kernel 628, services 630, and/or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) provide a higher-level common infrastructure that may be used by the applications 620 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 620 and/or other software components/modules, some of which may be specific to a particular operating system 614 or platform.

The applications 620 include built-in applications 640 and/or third-party applications 642. Examples of representative built-in applications 640 may include, but are not limited to, a contacts application, a browser application, a book reader application, a location application, a media application, a messaging application, and/or a game application. The third-party applications 642 may include an application developed using the Android™ or iOS™ software development kit (SDK) by an entity other than the vendor of the particular platform, and may be mobile software running on a mobile operating system 614 such as iOS™, Android™, Windows® Phone, or other mobile operating systems 614. The third-party applications 642 may invoke the API calls 624 provided by the mobile operating system, such as the operating system 614, to facilitate functionality described herein.

The applications 620 may use built-in operating system functions (e.g., kernel 628, services 630, and/or drivers 632), libraries 616, or frameworks/middleware 618 to create user interfaces to interact with users of the system. Alternatively, or additionally, in some systems, interactions with a user may occur through a presentation layer, such as the presentation layer 644. In these systems, the application/module "logic" can be separated from the aspects of the application/module that interact with a user.

Some software architectures 602 use virtual machines. In the example of FIG. 6, this is illustrated by a virtual machine 648. The virtual machine 648 creates a software environment where applications/modules can execute as if they were executing on a hardware machine (such as the machine 700 of FIG. 7, for example). The virtual machine 648 is hosted by a host operating system (e.g., operating system 614) and typically, although not always, has a virtual machine monitor 646, which manages the operation of the virtual machine 648 as well as the interface with the host operating system (i.e., operating system 614). A software architecture executes within the virtual machine 648, such as an operating system (OS) 650, libraries 652, frameworks 654, applications 656, and/or a presentation layer 658. These layers of software architecture executing within the virtual machine 648 can be the same as corresponding layers previously described or may be different.

Figure 7:
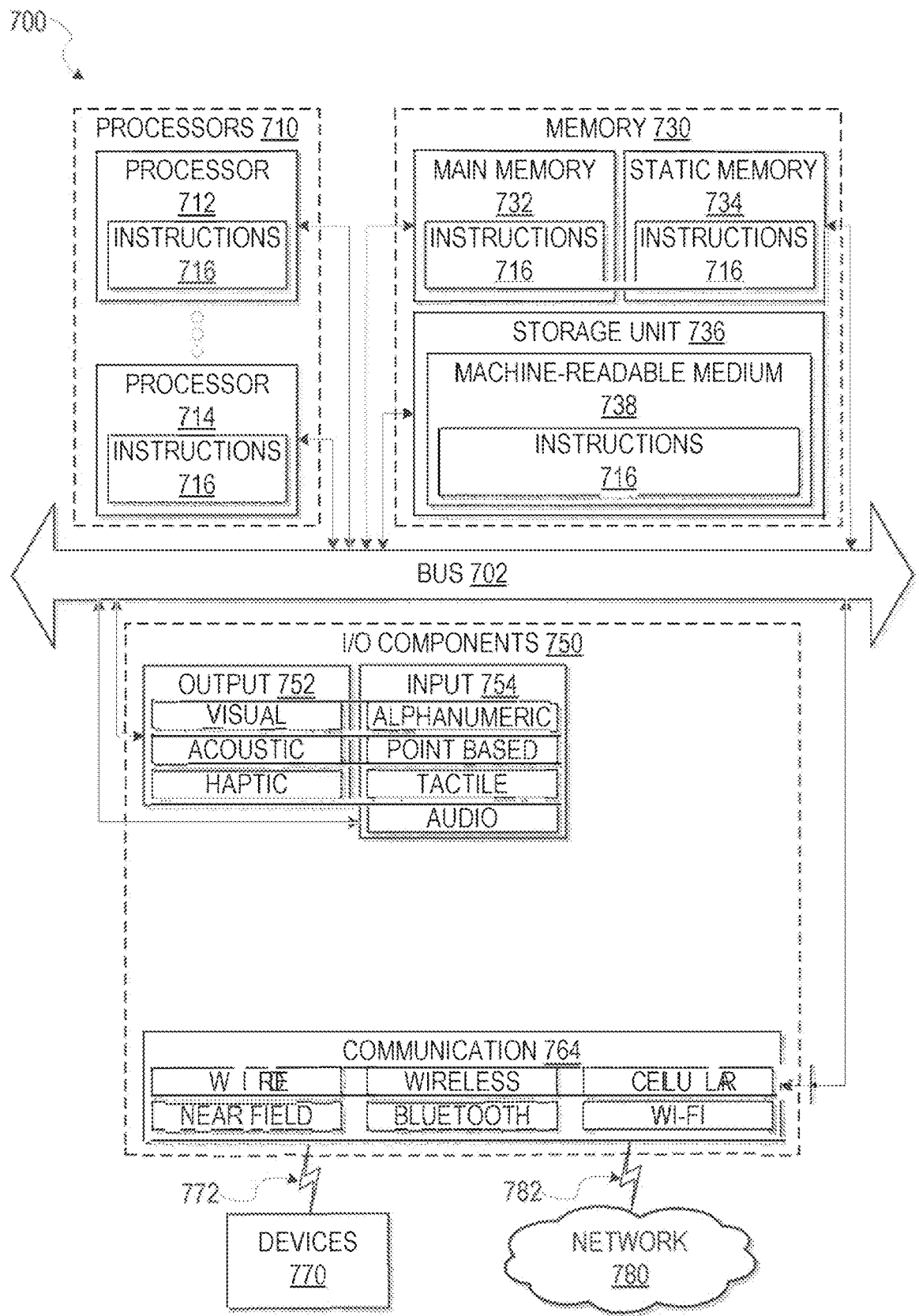
FIG. 7 is a block diagram illustrating components of a machine, according to some example embodiments, configured to read instructions from a machine-readable medium (e.g., a machine-readable storage medium) and perform any one or more of the methodologies discussed herein.

FIG. 7 is a block diagram illustrating components of a machine 700, according to some example embodiments, configured to read instructions 716 from a machine-readable medium 738 (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. As such, the instructions 716 may be used to implement modules or components described herein. The instructions 716 transform the general, non-programmed machine 700 into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a personal digital assistant (PDA), a cellular telephone, a smart phone, a mobile device, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and input/output (I/O) components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a GPU, a digital signal processor (DSP), an ASIC, a radio-frequency integrated circuit (RFIC), another processor, or any suitable combination thereof) may include, for example, a processor 712 and a processor 714 that may execute the instructions 716. The term "processor" is intended to include a multi-core processor 712 that may comprise two or more independent processors 712, 714 (sometimes referred to as "cores") that may execute the instructions 716 contemporaneously. Although FIG. 7 shows multiple processors 712, 714, the machine 700 may include a single processor 712 with a single core, a single processor 712 with multiple cores (e.g., a multi-core processor), multiple processors 712, 714 with a single core, multiple processors 712, 714 with multiples cores, or any combination thereof.

The memory/storage 730 may include a memory, such as a main memory 732, a static memory 734, or other memory, and a storage unit 736, both accessible to the processors 710 such as via the bus 702. The storage unit 736 and memory 732, 734 store the instructions 716 embodying any one or more of the methodologies or functions described herein. The instructions 716 may also reside, completely or partially, within the memory 732, 734, within the storage unit 736, within at least one of the processors 710 (e.g., within the processor's cache memory), or any suitable combination thereof, during execution thereof by the machine 700. Accordingly, the memory 732, 734, the storage unit 736, and the memory of the processors 710 are examples of machine-readable media 738.

As used herein, "machine-readable medium" means a device able to store the instructions 716 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 750 may include a wide variety of components to receive input, provide output, produce output, transmit information, exchange information, capture measurements, and so on. The specific I/O components 750 that are included in a particular machine 700 will depend on the type of machine. For example, portable machines 700 such as mobile phones will likely include a touch input device or other such input mechanisms, while a headless server machine 700 will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772 respectively. For example, the communication components 764 may include a network interface component or other suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine 700 or any of a wide variety of peripheral devices (e.g., a peripheral device coupled via a USB).

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

The invention claimed is:

1. A method comprising:
    training a custom neural network model associated with an item category with images of items labeled based on respective item categories of the items;
    retrieving a seed image of a seed item using a unique identifier to reference the seed image in a first database, wherein the seed item is associated with a listing representing an item for sale, and wherein the listing is categorized within the item category;
    converting the seed image to a standard size at a pixel granularity;
    generating, based on the seed image being the standard size, a seed item feature vector for the seed image by providing the seed image as an input to the custom neural network model associated with the item category, wherein the seed item feature vector includes an array of values representing features of the seed image;
    generating, based on comparing the seed item feature vector to one or more first feature vectors associated with one or more respective first listings categorized within the item category, a database entry for storage at a second database, wherein the database entry includes a first set of listings that are visually similar to the listing;
    generating, based on a numerical quantity of one or more additional database entries stored at the second database subsequent to the database entry satisfying a threshold value, an update to the database entry for storage at the second database, wherein the update to the database entry includes a second set of listings that are visually similar to the listing;
    receiving, after generating the update to the database entry for storage at the second database, a query for the listing based on engagement with the listing;
    responsive to the query, selecting one or more listings from the second set of listings; and
    communicating the one or more listings as a recommendation.

2. The method of claim 1, further comprising selecting the seed image of the seed item to retrieve based on a recentness of the seed image satisfying a recency threshold, a processing status of the listing, or both.

3. The method of claim 1, further comprising storing, at a third database, the seed item feature vector for the seed image.

4. The method of claim 3, wherein the third database comprises a plurality of feature vectors associated with respective listings of items for sale.

5. The method of claim 1, wherein the listing comprises the seed image, an indication of the item category, and a listing identifier associated with the listing.

6. The method of claim 1, wherein communicating the one or more listings is based on retrieving the update to the database entry corresponding to the second set of listings.

7. The method of claim 1, wherein the second set of listings is generated based on at least one feature vector being added to a third database storing the one or more first feature vectors.

8. The method of claim 1, wherein the custom neural network model is a convolutional neural network (CNN) model.

9. The method of claim 1, further comprising altering, prior to generating the seed item feature vector, one or more attributes of the seed image to normalize the seed image.

10. A system comprising:
    at least one processor; and
    a computer-readable storage medium storing instructions that are executable by the at least one processor to perform operations comprising:
        training a custom neural network model associated with an item category with images of items labeled based on respective item categories of the items;

retrieving a seed image of a seed item using a unique identifier to reference the seed image in a first database, wherein the seed item is associated with a listing representing an item for sale, and wherein the listing categorized within the item category;

converting the seed image to a standard size at a pixel granularity;

generating, based on the seed image being the standard size, a seed item feature vector for the seed image by providing the seed image as an input to the custom neural network model associated with the item category, wherein the seed item feature vector includes an array of values representing features of the seed image;

generating, based on comparing the seed item feature vector to one or more first feature vectors associated with one or more respective first listings categorized within the item category, a database entry for storage at a second database, wherein the database entry includes a first set of listings that are visually similar to the listing;

generating, based on a numerical quantity of one or more additional database entries stored at the second database subsequent to the database entry satisfying a threshold value, an update to the database entry for storage at the second database, wherein the update to the database entry includes a second set of listings that are visually similar to the listing;

receiving, after generating the update to the database entry for storage at the second database, a query for the listing based on engagement with the listing;

responsive to the query, selecting one or more listings from the second set of listings; and communicating the one or more listings as a recommendation.

11. The system of claim 10, the operations further comprising selecting the seed image of the seed item to retrieve based on a recentness of the seed image satisfying a recency threshold, a processing status of the listing, or both.

12. The system of claim 10, the operations further comprising storing, at a third database, the seed item feature vector for the seed image.

13. The system of claim 12, wherein the third database comprises a plurality of feature vectors associated with respective listings of items for sale.

14. The system of claim 10, wherein the listing comprises the seed image, an indication of the item category, and a listing identifier associated with the listing.

15. The system of claim 10, wherein communicating the one or more listings is based on retrieving the update to the database entry corresponding to the second set of listings.

16. The system of claim 10, wherein the second set of listings is generated based on at least one feature vector being added to a third database storing the one or more first feature vectors.

17. The system of claim 10, wherein the custom neural network model is a convolutional neural network (CNN) model.

18. The system of claim 10, the operations further comprising altering, prior to generating the seed item feature vector, one or more attributes of the seed image to normalize the seed image.

19. One or more non-transitory computer-readable storage media storing instructions that, responsive to execution by at least one processor, cause the at least one processor to perform operations comprising:

training a custom neural network model associated with an item category with images of items labeled based on respective item categories of the items;

retrieving a seed image of a seed item using a unique identifier to reference the seed image in a first database, wherein the seed item is associated with a listing representing an item for sale, and wherein the listing is categorized within the item category;

converting the seed image to a standard size at a pixel granularity;

generating, based on the seed image being the standard size, a seed item feature vector for the seed image by providing the seed image as an input to the custom neural network model associated with the item category, wherein the seed item feature vector includes an array of values representing features of the seed image;

generating, based on comparing the seed item feature vector to one or more first feature vectors associated with one or more respective first listings categorized within the item category, a database entry for storage at a second database, wherein the database entry includes a first set of listings that are visually similar to the listing;

generating, based on a numerical quantity of one or more additional database entries stored at the second database subsequent to the database entry satisfying a threshold value, an update to the database entry for storage at the second database, wherein the update to the database entry includes a second set of listings that are visually similar to the listing;

receiving, after generating the update to the database entry for storage at the second database, a query for the listing based on engagement with the listing;

responsive to the query, selecting one or more listings from the second set of listings; and communicating the one or more listings as a recommendation.

20. The one or more non-transitory computer-readable storage media of claim 19, the operations further comprising altering, prior to generating the seed item feature vector, one or more attributes of the seed image to normalize the seed image.

* * * * *